Dec. 14, 1943.    W. A. SCHULZE    2,336,643
PROCESS FOR TREATMENT OF HYDROCARBONS
Filed Aug. 23, 1940
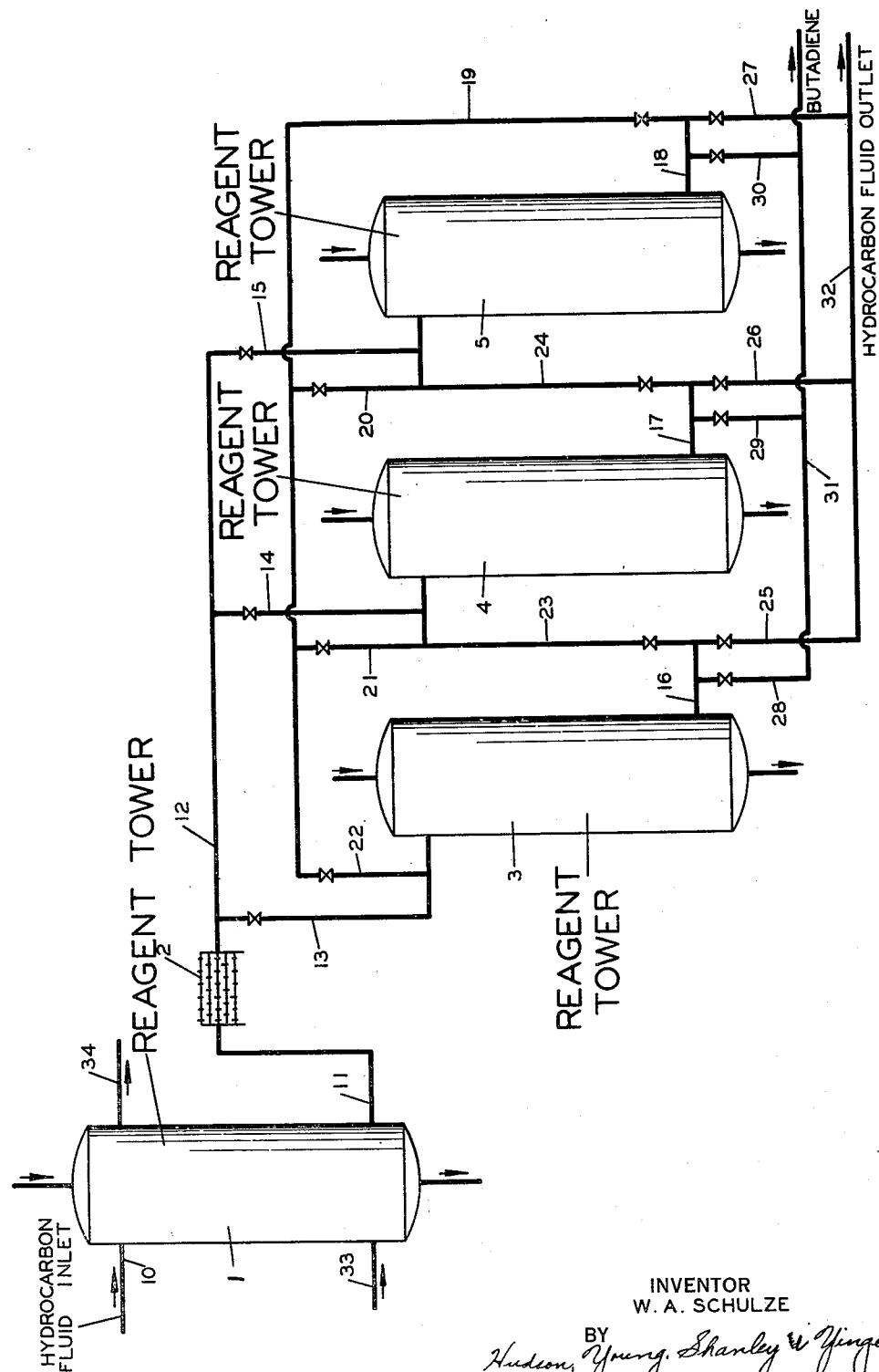
INVENTOR
W. A. SCHULZE
ATTORNEY Patented Dec. 14, 1943

2,336,643

UNITED STATES PATENT OFFICE 2,336,643

PROCESS FOR TREATMENT OF HYDROCARBONS

Walter A. Schulze, Bartlesville, Okla., assignor to Philips Petroleum Company, a corporation of Delaware Application August 23, 1940, Serial No. 353,963

6 Claims. (Cl. 260—681.5)

This invention relates to a process for the absorption and recovery of diolefins from complex hydrocarbon mixtures. It relates more specifically to an improved process for the absorption of butadiene, cyclopentadiene, isoprene, and various hexadienes from hydrocarbon mixtures containing same and derived from the pyrolytic and/or catalytic treatment of petroleum fractions or suitable hydrocarbon stocks from any source.

The production of diolefinic hydrocarbons, for example butadiene, involves the manufacture and/or segregation of hydrocarbon mixtures comprising the desired diolefin along with other unsaturates and paraffins of approximately the same boiling range, although higher and lower boiling components may be present. The concentration of the desired diolefin in such mixtures may vary over a wide range, depending on the method of manufacture and on previous purifying and/or concentrating procedures. The satisfactory absorption of butadiene from said mixtures by chemical separation methods involves the use of a reagent of suitable specificity so that substantially only the diolefin is reactive. Further requirements of an operable absorption process are that the product of the diolefin reaction be easily separable from non-reactive material, and that the diolefin be recoverable from the reaction product by convenient and economical means.

The methods heretofore proposed for the absorption and recovery of diolefins from complex hydrocarbon mixtures have been based on the tendency of said diolefins to form metal salt addition complexes with certain metal salts. The outstanding difficulty in satisfactorily performing such addition reactions is that the metal salts proposed are capable of forming addition complexes with other unsaturated hydrocarbons which are present in all mixtures containing diolefins. These unsaturated hydrocarbons commonly associated with butadiene include acetylene, diacetylene and vinyl acetylene, and ethylene, propylene and the isomeric butenes. In general, these unsaturated compounds are divided into two classifications, the acetylenic hydrocarbons and the ethylenic hydrocarbons. The metal salt addition products of the acetylenic hydrocarbons are more stable than the corresponding butadiene addition products, while the ethylenic hydrocarbons form less stable addition products.

Earlier described processes for the absorption and recovery of butadiene have suggested the use of solutions of cuprous halides and particularly of cuprous chloride. It is a disadvantage of such processes that unsaturated compounds of the acetylene type are completely retained and those of the ethylene type are partially retained by the cuprous chloride solution, and the butadiene is therefore liable to contamination. Further, said cuprous halide solutions are corrosive to the ordinary metal equipment employed industrially, and investment and maintenance costs for corrosion-resistant equipment are high. Also, the efficiency of absorption in a solution containing solid reaction products is low, requiring special equipment and separation of the solids for stepwise or separate regeneration or desorption.

More recently there has been described in a co-pending application, Serial No. 354,086, filed August 24, 1940, an improved process for the absorption of diolefins from hydrocarbon fluids utilizing a solid-type reagent impregnated with a cuprous halide. Such a process has the advantage of retaining the diolefin reaction product on the reagent surfaces during contact, thus eliminating the step of separating said product prior to diolefin desorption. Also, the solid type reagent is non-corrosive and gives more efficient absorption of diolefin due to the extreme dispersion of the cuprous halide on the reagent surfaces and to the fact that true counter-current contacting is obtained. Either gas or liquid phase absorption is possible with this solid reagent, and important economies are possible since solution circulating costs are eliminated and equipment size is reduced.

When a hydrocarbon fluid containing butadiene is contacted with a solid reagent consisting of an adsorbent carried impregnated with a cuprous halide, and disposed in a suitable chamber or contacting tower, that portion of the reagent contacted first reacts with reactive components of the passing fluid to form metal salt complex compounds. The operating conditions of flow rate and temperature are ordinarily adjusted so that the metal salt content of the reagent is combined or spent continuously in the direction of hydrocarbon flow through the bed of reagent. Under the treating conditions, equilibrium is thus established with respect to butadiene between the reagent and the hydrocarbon at some definite concentration of butadiene in each medium. Thus, in contact with fresh reagent, the butadiene concentration in the hydrocarbon will be essentially zero, while in contact with spent reagent the entire butadiene content will remain in the hydrocarbon. Further, at all intermediate points in the saturation of the reagent there is a corresponding equilibrium concentration of butadiene in the hydrocarbon stream. This means that for a given depth of reagent in a single tower and at a constant flow rate of hydrocarbon fluid through said tower the effluent hydrocarbon will be free of butadiene until a certain concentration of butadiene is accumulated on the increment of the reagent bed adjacent to the exit port. After this concentration is exceeded, butadiene will pass out in the effluents although the bottom sections of the reagent are not saturated, and a portion of the butadiene is still being absorbed. Thus, it is necessary to discontinue absorption at this point if the effluents are to be maintained substantially free of butadiene, and to regenerate the reagent before it is completely spent or saturated with said diolefin. Some further absorption may be obtained at sharply reduced flow rates, but this is not an economical use of plant equipment.

A further disadvantage of the incomplete spending of the cuprous salt reagent is that the portion of the reagent which is not saturated with respect to butadiene may retain some small amounts of undesirable ethylenic hydrocarbons as addition products. These compounds being less stable than the butadiene addition product, are displaced as the reagent is completely spent with respect to the diolefin. However, on desorption of a partially spent batch of reagent, some ethylenic hydrocarbons may be recovered along with butadiene, and thus lower the purity of the desired product.

When hydrocarbon fluids containing acetylenic compounds are brought in contact with solid cuprous halide reagents, the acetylenic compounds are absorbed simultaneously with the butadiene content of said fluids. These acetylenic addition compounds being more stable than the corresponding butadiene compounds are not displaced by butadiene even at the point of complete spending of the reagent. Thus, insofar as acetylene derivatives are present in a hydrocarbon fluid they will be present in the butadiene recovered by the use of cuprous halide reagents.

The co-precipitation of ethylenic and/or acetylenic compounds and butadiene results in the simultaneous desorption of said hydrocarbons during treatment of an absorption reagent to recover butadiene. The presence of contaminants in butadiene concentrates is extremely undesirable due to interference of the impurities in subsequent reactions for the utilization of butadiene.

I have now discovered certain improvements in the use of said solid-type cuprous halide reagents which result in a more satisfactory separation of butadiene from hydrocarbon fluids and more particularly from ethylenic and acetylenic hydrocarbons. By my improved process, more efficient reagent use results in the substantially complete recovery of higher purity butadiene in a highly satisfactory method of continuous operation as hereinafter disclosed.

According to my invention, a hydrocarbon fluid containing the butadiene which is to be absorbed and recovered is first passed at suitable flow rates over a solid reagent impregnated with a salt of a heavy metal of groups 1 and 2 of the periodic system. The temperature is maintained during this first contacting step at ordinary atmospheric temperatures of 80° to 110° F. with the result that only minor amounts of diolefinic and ethylenic hydrocarbons are absorbed while acetylene and its homologues react with the metal salt to form metal acetylides.

From the first contacting step, the hydrocarbon fluid passes through coolers to lower the temperature to values within the range of 40° to 80° F. and into a series of reagent towers containing a solid reagent impregnated with cuprous-chloride. The hydrocarbon is passed through two or more towers in series in such a manner that the reagent in the first tower is completely spent before butadiene appears in the effluent from the last tower. One or more stand-by reagent towers are provided, so that when a tower in the absorption series is spent, it can be cut out of the series and a new or a previously regenerated tower can be cut in as the last tower in said series. The completely spent tower is then heated and/or evacuated to break up the butadiene-cuprous chloride complex and recover the substantially pure butadiene thus evolved.

The invention may be specifically illustrated by the flow diagram of the drawing, which indicates one specific arrangement of equipment for the practice of my process. The hydrocarbon fluid enters by line 10 and passes through tower 1 which is filled with reagent for the fixation of acetylenic hydrocarbon compounds. The tower is fitted with tubes for circulation of heating or cooling media through the reagent bed. After passing through the reagent in 1, the hydrocarbon stream passes out by line 11 through cooler 2 and into manifold 12 from which it can enter any of the butadiene absorption towers 3, 4 and 5.

Assuming that towers 3 and 4 are being operated in series, the hydrocarbon fluid passes through line 13 into tower 3 and out by line 16 and line 23 into tower 4. The butadiene-free hydrocarbons then pass from tower 4 by line 17 and line 26 into the outlet manifold 32.

When the reagent in tower 3 is completely saturated with respect to butadiene, this tower is cut out of the stream, and tower 4 becomes the first of the absorption series. The hydrocarbon then enters by line 14, and leaves by line 17 and line 24 into tower 5. The discarded hydrocarbon then exits from the system by lines 18 and 27 into the outlet 32.

The butadiene is recovered from tower 3 by heating the tower and removing butadiene by lines 16 and 28 into the butadiene manifold 31. The absorption towers 3, 4 and 5 are all fitted with means for circulating a cooling and a heating medium during the absorption and desorption steps respectively. The necessary piping is provided so that any two of these towers may be placed in series flow. Thus, the hydrocarbons may enter tower 5 through line 15, and then flow through lines 18, 19 and 22 to tower 3, finally leaving through line 25 to outlet 32; or from tower 5 through lines 18, 19, and 21 to tower 4. When tower 5 is second in the series, the hydrocarbon stream will be introduced thereinto through line 20. Lines 29 and 30 are provided for the effluent butadiene from towers 4 and 5 respectively, when these towers are being desorbed.

When the reagent in tower 1 becomes spent so that acetylenic hydrocarbons are no longer removed, the tower may be heated and purged with inert gas through lines 33 and 34.

The reagent used in the absorption series of towers consists of a solid adsorbent carrier such as fuller's earth, bauxite, charcoal, silica gel, activated alumina or the like impregnated with a cuprous halide. Cuprous chloride is an excellent reagent and may be used alone or in mixtures with other cuprous halides and chlorides of alkali and/or alkaline earth metals. The carriers may be impregnated with the cuprous halide in any convenient manner such as spraying with a suitable salt solution. One or more successive applications of the salt solution with intermediate partial drying may be employed to produce a reagent with a high weight per cent of the cuprous salt ordinarily between 10 and 30 per cent. Following the final impregnation the water content of the reagent may be adjusted to prevent the loss or migration of aqueous solution during the absorption and desorption operations.

The reagent used in the initial contacting tower may be the same as that used for the absorption of butadiene, or it may be a different composition for the specific reaction with acetylenic hydrocarbons. The method of preparation is essentially the same and consists of impregnating an adsorbent carrier with a solution of metal salt. The metal salts useful for this step are those of the heavy metals of groups 1 and 2 of the periodic system or mixtures of said salts. While silver salts are less desirable from the standpoint of cost, excellent results are obtained with salts of copper and mercury either in monovalent form or in mixtures containing both valence states.

When the reagent used for the removal of acetylenic compounds is identical with that used for the absorption of butadiene, the desired specific reaction is obtained largely through the control of the temperature in the contacting operation. Thus the temperature may be adjusted so as to result in the absorption of very small amounts of butadiene along with all of the acetylene derivatives. Or alternately the temperature may be adjusted to allow absorption of both butadiene and acetylenic derivatives, with the more stable acetylenic addition products gradually displacing the butadiene, and with periodic desorption or regeneration of the reagent wherein the desorbed hydrocarbons are discarded.

When the reagent for the acetylene removal step is prepared specifically for reaction with acetylenic hydrocarbons, temperature control is less critical because conditions are less favorable for the absorption of diolefins. In this case, the temperature is regulated to give suitable absorption of acetylenic compounds, and the spent reagent may be discarded, or if regenerated, the desorbed hydrocarbons are vented from the system.

Although a single acetylene removal tower is illustrated in the drawing, a plurality of these units may be provided to facilitate continuous operation.

In the absorption of butadiene subsequent to the acetylene removal step, the number of reagent towers used in series will depend on the flow rate of hydrocarbon fluid and on the diolefin concentration of the fluid as well as on the capacity of the reagent in a single tower. The weight of cuprous chloride in a single tower will determine the weight of butadiene which can be absorbed therein. Assuming that two towers are used in series, if this weight of butadiene is absorbed in a period of eight hours and a similar period is allowed for the desorption or regeneration operation, a minimum of three towers is required for continuous operation. When three towers are used in series for a similar flow rate and spending period per tower, a minimum of four towers are required. The correlation of flow rate and absorption-desorption cycle time with the number of reagent towers required for a given operation is a matter easily handled by those skilled in the art in view of the disclosed features within the scope of my invention.

It is necessary that at least two absorption towers, or even more, be used in series. Complete displacement of ethylene hydrocarbons depends largely on keeping the first tower in the series on stream until the absorption of butadiene has substantially ceased, and a convenient time schedule for desorption without allowing any butadiene to escape in the effluents from the system is more easily obtained the larger the number of absorption towers used in series.

The temperatures maintained in the initial step of my process will depend somewhat on the nature of the reagent used for acetylene removal. When the reagent has a relatively small affinity for butadiene, ordinary atmospheric temperatures of 70° to 90° F. are suitable. If the reagent is identical with that used in the butadiene absorption, the temperature may be rather closely maintained within the range of 80° to 110° F. by circulation of heating or cooling media as required.

The absorption of butadiene is carried out at temperatures favorable to the formation of the cuprous halide addition compound. Using a cuprous chloride reagent, temperatures within the range of 40° to 80° F. are ordinarily satisfactory although higher or lower temperatures may be used if desired and operating conditions are controlled accordingly.

Pressures required in my process are low superatmospheric pressures, although subatmospheric pressures may be employed during the desorption step. In general, sufficient pressure is applied to maintain the flow of hydrocarbons through the reagent towers and auxiliary equipment, but for gas phase contacting the pressure is limited by the dew-point of the hydrocarbon gas at contacting temperatures. For liquid phase contacting this limitation is removed.

The flow rate of hydrocarbon fluids is adjusted so that satisfactory absorption is obtained in each phase of my process. The flow rate will vary with the treating conditions and with the diolefin content of hydrocarbon stream. In liquid phase treating flow rates of 1 to 5 liquid volumes per hour per volume of reagent are usually satisfactory. In gas phase contacting linear gas velocities not in excess of five feet per minute are ordinarily employed.

Since the temperature must be maintained at relatively low values during the absorption step, means for removing the heat of formation of the metal salt complexes must be provided. This may be accomplished by pre-cooling the hydrocarbon stream at a convenient point and by providing indirect heat exchange within the reagent bed. This heat exchange system may then be used to introduce heat during the desorption operation.

In the desorption operation, temperatures within the range of 120° to 190° F. are most convenient for rapid decomposition of the butadiene-cuprous chloride addition compound. The butadiene thus released may be swept out of the reagent tower with inert gas and/or vacuum may be applied if desired.

The following example will serve to illustrate one application of my process. However, since the invention is subject to numerous modifications, all within the scope of the foregoing disclosure, said example is not to be interpreted as a limitation thereof.

Example

A liquid $C_4$ hydrocarbon fraction derived from the thermal cracking of light hydrocarbons was processed for the recovery of butadiene. The approximate analysis of the liquid in parts by volume was as follows:

| | |
|---|---|
| Butadiene | 3 |
| Butenes | 16 |
| Butanes | 11 |
| Propane | 60 |
| Propylene | 6 |
| Ethane | 2 |
| Ethylene | 1.8 |
| Methyl and vinyl acetylene | 0.2 |

The liquid passed first over a reagent consisting of bauxite impregnated with a mixture amounting to 25 per cent by weight of cupric and cuprous chlorides at a temperature of 85° F. and a flow rate of one liquid volume per hour per volume of reagent. The effluent from this treatment was free of acetylenic hydrocarbons, and after being cooled to 40° F., passed to the butadiene absorption system.

The butadiene was absorbed by passing the liquid through two reagent towers in series containing a reagent composed of fuller's earth impregnated with 25 per cent by weight of cuprous chloride. The temperature in the two towers was maintained at 45° F. and the flow rate was the same as in the initial contacting step. The passage of the hydrocarbon was continued until the effluents from the first tower showed substantially the same butadiene content as the feed to said tower. At this point, the spent tower was cut out of the stream, and a newly regenerated tower was placed on stream as the second absorption tower.

The spent absorption tower was slowly heated and residual liquid and gas was forced out with methane gas while the temperature was raised to 120° F. Above this temperature evolution of butadiene was begun and increased while the temperature was raised to 150° F. The evolved butadiene after cooling, liquefying, and stabilizing to remove dissolved methane was over 99 per cent pure and was taken to storage. When evolution had ceased, the tower was again swept out with inert gas, after which it was cooled for further absorption service.

The same hydrocarbon liquid was passed under identical absorbing conditions directly over a batch of the same reagent in a single reagent tower. In this operation, the absorption was halted when butadiene appeared in the effluents from the single tower, and the reagent was treated to desorb the hydrocarbons according to the above-described procedure. The desorbed material was liquefied and stabilized to remove methane and had the following composition in parts by volume.

| | |
|---|---|
| Butadiene | 92 |
| Butenes | 2 |
| Methyl and vinyl acetylene | 6 |

While my invention has been described with particular emphasis on the absorption and recovery of butadiene, I have noted that under proper conditions other diolefins of 5 or 6 or more carbon atoms may be absorbed and concentrated from hydrocarbon mixtures of corresponding boiling range. Thus to obtain pure butadiene reasonably close-cut $C_4$ fractions must be treated.

I claim:

1. A process for the substantially complete recovery of pure diolefins from hydrocarbon fluids containing the same together with other unsaturated hydrocarbons, which comprises contacting said fluids with a solid reagent comprising an adsorbent carrier impregnated with a salt of a heavy metal of groups 1 and 2 of the periodic system to selectively absorb any unsaturated hydrocarbons forming metal salt addition compounds more stable than the corresponding diolefin addition compounds, then passing said fluids in contact with a solid reagent comprising an adsorbent carrier impregnated with cuprous halide and disposed in a series of at least two zones at flow rates such that the effluent from the last zone in said series is substantially free of diolefins, discontinuing the flow of said fluids when the diolefin contents of the inlet and effluent streams of the first zone in said series are substantially the same whereby the cuprous halide reagent is obtained substantially saturated with a diolefin-cuprous halide complex and substantially free from any unsaturated hydrocarbons forming less stable complexes, and desorbing substantially pure diolefins from the reagent in said first zone in said series.

2. A process for the recovery of butadiene from hydrocarbon fluids containing same which comprises contacting said fluids with a solid reagent comprising an adsorbent carrier impregnated with a salt of a heavy metal of groups 1 and 2 of the periodic system at temperatures such that any acetylenic hydrocarbons present are removed while butadiene is substantially unabsorbed, then passing said fluids in contact with a reagent comprising an adsorbent carrier impregnated with cuprous chloride disposed in a series of at least two reagent zones at flow rates such that the effluent from the last zone of said series is substantially free of butadiene, discontinuing the flow of hydrocarbon fluids through said series of reagent zones when the butadiene contents of the inlet and effluent streams of the first zone in said series are substantially the same whereby the reagent in said first zone is obtained free from ethylenic hydrocarbons, and treating the reagent in said first zone of said series to desorb the butadiene therefrom substantially free of acetylenic and ethylenic hydrocarbons.

3. The process of claim 2 wherein the reagent initially contacted by the hydrocarbon fluid is fuller's earth impregnated with a mixture of cupric and cuprous halides.

4. The process of claim 2 wherein the temperature within the initial reagent bed is maintained within the range of 80° to 110° F. and the temperature of the butadiene absorption step is maintained within the range of 40° to 80° F.

5. In a process for the recovery of butadiene from hydrocarbon fluids containing same in mixture with other unsaturated hydrocarbons comprising acetylenic and ethylenic hydrocarbons by means of a solid reagent impregnated with a cuprous halide, the steps of first contacting said fluids with a single portion of said reagent at temperatures sufficient to permit the formation of cuprous halide addition compounds more stable than the corresponding butadiene addition compound by reaction of said undesired unsaturated hydrocarbons with said cuprous halide, then successively contacting said fluids with a series of at least two portions of said reagent under conditions such that the effluent from the last portion of said series is substantially free of butadiene, and finally discontinuing the flow of said fluids when the butadiene contents of the inlet and the effluent streams of the first portion of reagent in said series are substantially the same, and treating said first portion of reagent to desorb the butadiene therefrom substantially free of acetylenic and ethylenic hydrocarbons.

6. A process for the recovery of diolefins from hydrocarbon fluids containing the same along with acetylenic hydrocarbons which comprises contacting said fluids with a solid reagent comprising an adsorbent carrier impregnated with a salt of a heavy metal of groups 1 and 2 of the periodic system at temperatures above those at which diolefins are appreciably absorbed, whereby substantially all of said acetylenic hydrocarbons are absorbed and removed from the fluids, then contacting the fluids with a second solid reagent comprising an adsorbent carrier impregnated with cuprous halide at a lower temperature to absorb said diolefins, and finally heating the second reagent to desorb the diolefins therefrom substantially free of acetylenic hydrocarbons.

WALTER A. SCHULZE.